United States Patent
Haessig

(10) Patent No.: US 9,827,734 B2
(45) Date of Patent: Nov. 28, 2017

(54) APPARATUS FOR PRODUCING CORRUGATED BOARD PRODUCTS HAVING AN OBLIQUE FLUTE PROFILE

(71) Applicant: PROGROUP AG, Landau (DE)

(72) Inventor: Christophe Haessig, Hunspach (FR)

(73) Assignee: PROGROUP AG, Landau (DE)

( * ) Notice: Subject to any disclaimer, the term of this patent is extended or adjusted under 35 U.S.C. 154(b) by 343 days.

(21) Appl. No.: 14/410,761

(22) PCT Filed: Jul. 5, 2013

(86) PCT No.: PCT/EP2013/002019
§ 371 (c)(1),
(2) Date: Dec. 23, 2014

(87) PCT Pub. No.: WO2014/075748
PCT Pub. Date: May 22, 2014

(65) Prior Publication Data
US 2015/0321440 A1     Nov. 12, 2015

(30) Foreign Application Priority Data
Jul. 5, 2012    (EP) .................................... 12004993

(51) Int. Cl.
*B31F 1/28*     (2006.01)
*B31F 1/24*     (2006.01)
*B32B 29/08*    (2006.01)

(52) U.S. Cl.
CPC ............ *B31F 1/242* (2013.01); *B31F 1/2804* (2013.01); *B31F 1/2813* (2013.01);
(Continued)

(58) Field of Classification Search
None
See application file for complete search history.

(56) References Cited

U.S. PATENT DOCUMENTS

| | | | |
|---|---|---|---|
| 2,759,523 A | * | 8/1956 | Goldstein ............. B31F 1/2813 156/207 |
| 3,513,054 A | | 5/1970 | Carrel |

(Continued)

FOREIGN PATENT DOCUMENTS

| | | |
|---|---|---|
| BE | 899067 | 7/1984 |
| DE | 1561510 | 10/1970 |

(Continued)

OTHER PUBLICATIONS

International Preliminary Report on Patentability dated Jan. 6, 2015 for International Application No. PCT/EP2013/002019, 12 pages.

*Primary Examiner* — Barbara J Musser
(74) *Attorney, Agent, or Firm* — Kilpatrick Townsend & Stockton LLP

(57) ABSTRACT

The invention relates to a method and an apparatus for the production of a corrugated cardboard product. The apparatus comprises a first single facer and a second single facer which are provided in each case with a press-down belt and with a first and a second grooving roller respectively. The first and the second grooving roller are designed for embossing a wave profile onto a first and a second paper web respectively. The press-down belts, together with the respective grooving rollers, for connecting the first and the second paper webs in each case to a non-corrugated web for the production of a first and a second single-flute corrugated cardboard web respectively. The first single facer is equipped with a first oblique guide roller, the axis of rotation of which is inclined at a vertical inclination angle between side margins of the first paper web.

14 Claims, 7 Drawing Sheets

(52) U.S. Cl.
CPC .......... *B31F 1/2836* (2013.01); *B31F 1/2877* (2013.01); *B32B 29/08* (2013.01); *B32B 2250/05* (2013.01); *B32B 2250/26* (2013.01); *Y10T 156/1016* (2015.01); *Y10T 428/24727* (2015.01)

(56) References Cited

U.S. PATENT DOCUMENTS

| | | | |
|---|---|---|---|
| 4,566,922 A | | 1/1986 | Martinez |
| 5,389,183 A | * | 2/1995 | Seki ...................... B31F 1/2831 156/210 |
| 5,693,167 A | * | 12/1997 | Cahill ................... B31F 1/2813 156/205 |

FOREIGN PATENT DOCUMENTS

| | | |
|---|---|---|
| DE | 102010013269 | 9/2011 |
| FR | 1212042 | 3/1960 |
| FR | 2541628 | 8/1984 |
| WO | WO 93/19932 | 10/1993 |

\* cited by examiner

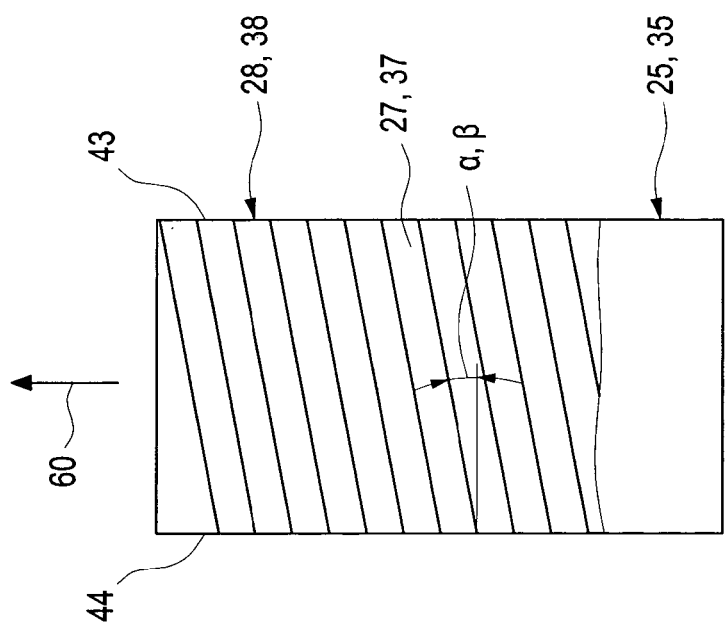
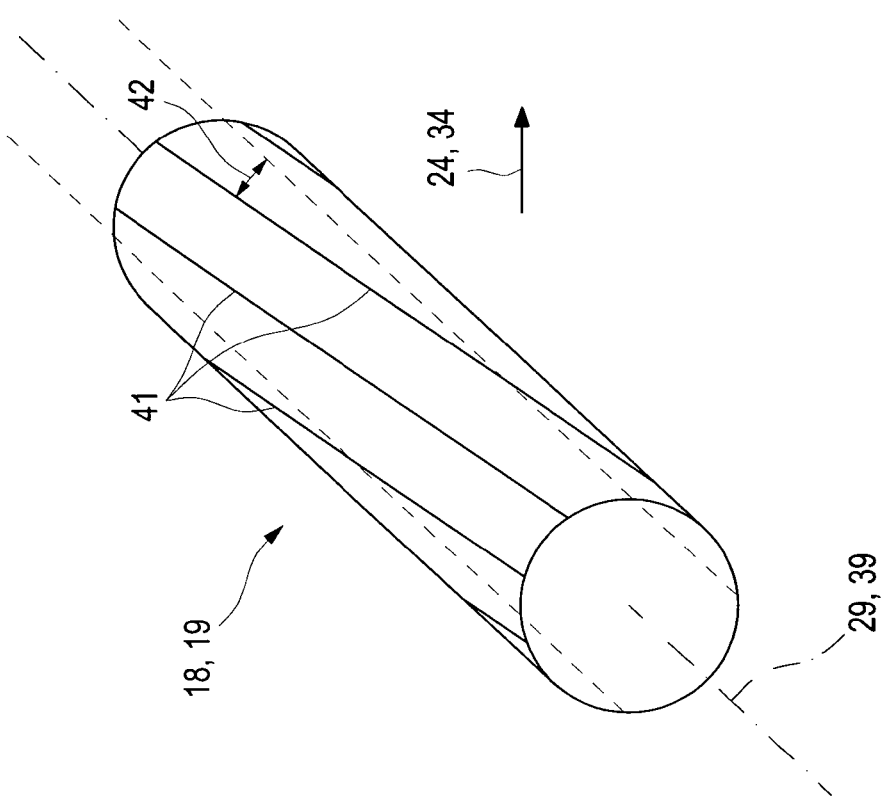

APPARATUS FOR PRODUCING CORRUGATED BOARD PRODUCTS HAVING AN OBLIQUE FLUTE PROFILE

TECHNICAL FIELD

The invention relates to an apparatus and a method for the production of corrugated cardboard products which serve, for example, as packaging material. Corrugated cardboard products are produced from individual paper webs, a corrugated cardboard product comprising smooth and corrugated paper plies which are connected to one another. Corrugated cardboard products are produced by a continuous method in machines which are equipped with paper reels and generate stacks of corrugated cardboards which can be processed further, for example, into packaging.

PRIOR ART

DE 1 561 510 discloses a method for the continuous production of stiff corrugated cardboard, in which two webs of corrugated cardboard having oblique corrugations are glued to one another. The webs having oblique corrugations are produced by a cardboard web being in each case led through between two coupled corrugating cylinders, the corrugating cylinders being manufactured with helical grooving. A cardboard web which is led through the coupled corrugating cylinders is brought, at an angle β, lying in a horizontal plane, with respect to the running direction of the corrugated cardboard machine, up to a smooth web and is glued to the latter. This gives rise to a composite web. Two composite webs are subsequently connected to one another in such a way that their corrugated sides are glued to one another without an intermediate ply. The disadvantage of the method according to DE 1 561 510 is that the apparatus required for it is designed only for corrugated cardboard without an intermediate ply between the composite webs. Other types of corrugated cardboard, in particular those with an intermediate ply, can be generated only after a complicated conversion of the apparatus used for this purpose. Furthermore, such apparatuses have a considerable width and take up a large amount of space.

PRESENTATION OF THE INVENTION

The object on which the present invention is based is to make available a possibility for producing corrugated cardboard products simply and cost-effectively. Furthermore, the object on which the present invention is based is to provide an apparatus and a method for the production of corrugated cardboard products, which can be changed over quickly and at low outlay between corrugated cardboard products having differing architecture. Moreover, the object on which the invention is based is to make available a space-saving apparatus for the production of corrugated cardboard products.

The apparatus according to the invention comprises a first single facer and a second single facer which are provided in each case with a press-down belt. Furthermore, the single facers are equipped with a first and a second grooving roller which are designed in each case for embossing a wave profile into a paper web. The first single facer embosses a wave profile into a first paper web and the second single facer embosses a wave profile into a second paper web. The first and the second paper web are subsequently connected in each case to a non-corrugated web by means of a press-down belt. The first and the second paper web which are connected to a non-corrugated web form respectively a first and a second single-flute corrugated cardboard web. Moreover, the first single facer is equipped with a first oblique guide roller, of which the axis of rotation between side margins of the first paper web is inclined at a vertical inclination angle.

The connection of the first and the second paper web to the first and the second non-corrugated web respectively takes place advantageously by means of a press-down belt which makes it possible to act upon the connection of the individual plies with a high pressure pulse. The first and the second paper web are in this case connected respectively to the first and the second non-corrugated web by means of an adhesive. The application of the pressure pulse takes place by means of the press-down belt with a low pressure force, thus keeping the mechanical stress upon the processed paper webs low. The action of a low pressure force makes it possible to achieve a high degree of quality of the corrugated cardboard product. Furthermore, a press-down belt has low vibration during operation, so that the connection of the paper webs to the non-corrugated webs takes place with high geometric accuracy. The first oblique guide roller is advantageously mounted upstream of an entry of the first paper web into a nip of the first grooving roller. The first paper web is held in a tensioned state over its width by means of the first oblique guide roller. The tensioned state ensures that the first paper web is drawn exactly into a nip of the first grooving roller, with the result that the corrugation applied to the first paper web by the first grooving roller has a high degree of precision. This enables the width of the apparatus to be kept low and space to be saved. Wide oblique web guides are avoided. Alternatively, with the apparatus having a given construction width, the width of the processed paper webs can be increased. The quantity of corrugated cardboard product capable of being produced per unit time thereby rises.

Furthermore, the apparatus according to the invention may have a second single facer which is provided with a second oblique guide roller. The axis of the second oblique guide roller may be inclined at a vertical inclination angle between side margins of the second paper web. The second oblique guide roller may advantageously be mounted in the second single facer in such a way that the second paper web is guided via the second oblique guide roller before contact with the second grooving roller. The vertical inclination angle of the axis of the second oblique guide roller makes it possible to hold the second paper web in a tensioned state. The tensioned state of the second paper web ensures that the second paper web is drawn exactly into a nip of the second grooving roller, with the result that the wave profile applied by the second grooving roller has a high degree of precision. The vertical inclination angle of the axis of the second oblique guide roller makes it possible, furthermore, to guide the second paper web parallel to the second non-corrugated web and the running direction of the apparatus. As a result, the width of the apparatus is kept low; wide oblique web guides are avoided.

Moreover, in the apparatus according to the invention, the first and the second oblique guide roller can have which are inclined at contradirectionally oriented vertical inclination angles. The orientation of the vertical inclination angle of the first and of the second oblique guide roller causes uniform tautening thereof from side margin to side margin. The vertical inclination angle of the first and of the second oblique guide roller corresponds essentially to the orientation of a grooving of the helical grooving rollers. This ensures a material-compatible feed of a paper web to a nip of a grooving roller, thus allowing exact processing of the paper webs.

Moreover, the apparatus may be provided with a first single facer which has a first web conveying direction which is opposite to a second web conveying direction of the second single facer. Opposite web conveying directions make it possible to bring the single-flute corrugated cardboard webs, produced by the single facers, together over a short length in the running direction of the apparatus. The apparatus according to the invention can thereby be kept short in a space-saving way.

Moreover, in the apparatus according to the invention, the second single facer may be provided with a deflection which is designed for deflecting the second single-flute corrugated cardboard web. The deflection makes available a simple and reliable possibility for rotating or turning a single-flute corrugated cardboard web. Especially advantageously, the second single-flute corrugated cardboard web is in contact with the deflection at a looping angle of 90° to 180°. Advantageously, further, the deflection is designed with a bending radius of 0.5 m to 1.5 m.

Such a large looping angle and such a large bending radius make it possible to have a material-protecting deflection of the second single-flute corrugated cardboard web. Furthermore, high dimensional stability of a corrugated web of the single-flute corrugated cardboard web is ensured. Distortion or deformation of the second single-flute corrugated cardboard web is thereby minimized, with the result that the achievable quality of the corrugated cardboard products rises. Preferably, the deflection is designed as a stationarily arranged guide plate or a stationarily arranged deflecting plate which deflects the second single-flute corrugated cardboard web in a radius of between 0.5 and 1.5 mm, so that, by virtue of the selected radii ranges, high mechanical load upon the first single-flute corrugated cardboard web is avoided.

Moreover, the apparatus according to the invention may be equipped with a first grooving roller which is provided with helical grooving. The helical grooving has a pitch angle with respect to the axis of rotation of the first grooving roller. The helical grooving having an pitch angle along the axis of rotation of the first grooving roller makes it possible to provide the first paper web with a wave profile which is oriented obliquely to the first web conveying direction. A helical grooving roller thus makes it possible, in a continuous production process, to provide a paper web in a simple way with a wave profile which allows material-saving and stiff corrugated cardboard architectures.

In a further advantageous embodiment, the pitch angle of the helical groove in the first grooving roller has the same orientation as the inclination angle of the first vertically inclined guide roller. In this case, the orientation of the pitch angle and of the vertical inclination angle relate, as seen in a conveying direction of the first or of the second paper web, to a conveying plane of the first or the second paper web. Furthermore, in an advantageous embodiment of the apparatus according to the invention, the pitch angle of the helical grooving of the first grooving roller and the inclination angle of the first vertically inclined guide roller are essentially of equal size. This ensures a high degree of processing precision for the corrugated cardboard product to be produced. Furthermore, this avoids one-sided mechanical overstressing of the paper web, which may cause the web to tear. The reliability of the apparatus according to the invention is thereby increased. Furthermore, in the same way, the apparatus according to the invention may be equipped with a second grooving roller which has helical grooving. In this case, the helical grooving of the second grooving roller has a pitch angle with respect to the axis of rotation.

In a further advantageous embodiment, the pitch angle of the helical grooving of the second grooving roller has the same orientation as the inclination angle of the second vertically inclined guide roller. The orientation of the pitch angle and of the vertical inclination angle in this case relate, as seen in a conveying direction of the first or of the second paper web, to a conveying plane of the first or of the second paper web. The size of the pitch angle of the helical grooving and the inclination angle of the second vertically inclined guide roller may in this case be essentially identical. The same technical advantages as in the case of the first grooving roller and of the first vertically inclined guide roller are afforded. In an advantageous embodiment, in which in each case the first vertical inclination angle corresponds in orientation and size to the helical pitch angle of the first grooving roller and the second vertical inclination angle corresponds in orientation and size to the helical pitch angle of the second grooving roller, a high degree of processing precision in the desired corrugated cardboard product is achieved.

Furthermore, the apparatus according to the invention may have a first grooving roller with helical grooving, the pitch angle of which matches with an offset angle $\alpha$ by which a corrugation of the first single-flute corrugated cardboard web is offset. Moreover, the second grooving roller with helical grooving may have a pitch angle which matches with an offset angle $\beta$ by which the corrugation of the second single-flute corrugated cardboard web is offset. The achievable accuracy of the offset angles $\alpha$ and $\beta$ corresponds to the manufacturing precision with which the first and the second grooving roller are produced. The offset angles $\alpha$ and $\beta$ can thereby be set exactly in the corrugated cardboard architecture. Corrugated cardboard architectures which fully utilize the strength of the paper employed can thereby be implemented. As a result, with a view to a lightweight construction, material-saving and stable corrugated cardboard architectures, the strength of which is increased even further in the form of a composite corrugated cardboard structure, can be implemented. This refers particularly to corrugated cardboard architectures, in which the offset angles $\alpha$ and $\beta$ have different amounts or orientations and thereby form grid-shaped structures, for example, in a parting plane running centrally.

Advantageously, further, the apparatus according to the invention may have a feed roller which is suitable for bringing up an additional paper web. The feed roller can be integrated in a simple way into a machine design diagram if the apparatus is to be set up for the production of a corrugated cardboard product which requires an additional paper web, for example an intermediate ply. Furthermore, the feed roller can be deactivated in the apparatus in a simple way if the apparatus is to be set up for the production of corrugated cardboard products which comprise only single-flute corrugated cardboard webs.

Furthermore, in the apparatus according to the invention, the second single facer may be designed to operate in opposite operating directions. In this case, the operating direction of the second single facer may be reversed. It is thereby possible at low outlay to modify the machine design diagram of the apparatus according to the invention. Modification of the machine design diagram makes it possible to vary the sequences of a production process carried out by the apparatus and to implement different configurations of the apparatus. The production process carried out by the apparatus can thus be adapted at low outlay to different corrugated cardboard products to be produced. As a result, the apparatus according to the invention has a broad range of use and allows the cost-effective production of the corrugated cardboard product to be produced, while at the same time having short conversion times.

Moreover, the apparatus according to the invention may be equipped with a third single facer which serves for the production of a third single-flute corrugated cardboard web. In this case, the third single facer has a third grooving roller which is designed for embossing a wave profile onto a third paper web. The use of a third single facer makes it possible by means of the apparatus according to the invention to produced corrugated cardboard architectures which have increased complexity. The apparatus according to the invention can thus produce a larger number of corrugated cardboard products, so that the range of use is broadened. Furthermore, complex corrugated cardboard architectures make it possible to adapt the strength and stiffness of the desired corrugated cardboard product exactly to the intended use. Conversion to the configuration with the third single facer can be carried out in a short conversion time. In this case, rapid changes between two configurations are possible, and effective conversion times of a few minutes can be implemented. The apparatus according to the invention makes available a possibility for producing adapted, efficient and viable corrugated cardboard products in a simple way.

Furthermore, in the apparatus according to the invention at least one of the single facers may be provided in each case with a glue applicator roller. A glue applicator roller ensures simply and reliably a stable connection of the paper webs and non-corrugated webs which are connected to form single-flute corrugated cardboard webs.

The invention relates, furthermore, to a method for the production of corrugated cardboard products, an apparatus being used which comprises a first single facer with a first web conveying direction and a second single facer with a second web conveying direction. The method according to the invention in this case comprises the following steps:

In a first step, a first single-flute corrugated cardboard web is produced by means of the first single facer. In a further step, a second single-flute corrugated cardboard web is produced by means of the second single facer. During these steps, a first and a second paper web are guided respectively to a first and a second grooving roller. Before contact of the first and the second paper web respectively with the first and the second grooving roller, the first and the second grooving roller are steered in each case via a first and a second oblique guide roller. In a further step, the first single-flute corrugated cardboard web and the second single-flute corrugated cardboard web are brought together. In a subsequent step, the first and the second single-flute corrugated cardboard web are joined together and connected to one another in the region of a central parting plane to form the desired corrugated cardboard product. In the method according to the invention, the use of oblique guide rollers ensures that the first and the second paper web, in a portion before entry into a nip, are in a tensioned state respectively between the first and the second grooving roller and their respective counterpieces. Folding or creasing of the paper webs is thereby counteracted and failures of the apparatus are avoided. Furthermore, the tensioned state makes it possible to introduce the first and the second paper web precisely into the respective nip of the first and the second grooving roller, thus always ensuring a precise corrugation of the first and the second paper web. As a result, the achievable geometric exactness of the single-flute corrugated cardboard webs is increased and the quality of the corrugated cardboard product is improved.

In the method according to the invention, advantageously, the first and/or the second oblique guide roller may be inclined at a vertical inclination angle between side margins of the first and of the second paper web. The vertical inclination angle makes it possible to feed the first and the second paper web to the grooving rollers in parallel respectively with a first and a second web conveying direction of the first and the second single facer and with the running direction of the apparatus.

Furthermore, in the method according to the invention, a first single facer will be used which has a first web conveying direction which is opposite to a second web conveying direction of the second single facer. Opposite web conveying directions make it possible to bring the single-flute corrugated cardboard webs, produced by the single facers, together over a short length in the running direction of the apparatus.

Moreover, in an apparatus, the method according to the invention may be equipped with a first grooving roller which is provided with helical grooving. The helical grooving with a pitch angle along the axis of the first grooving roller makes it possible to provide the first paper web with corrugation which is oriented obliquely to the first web conveying direction. A helical grooving roller thus makes it possible in a simple way, in a continuous production process, to provide a paper web with a wave profile which allows material-saving and stiff corrugated cardboard architectures. Furthermore, in the method according to the invention, a second grooving roller which has helical grooving may be provided in the same way.

Furthermore, in the method according to the invention, a first grooving roller with helical grooving may be used, the pitch angle of which determines an offset angle $\alpha$ by which the wave profile of the first single-flute corrugated cardboard web is offset upon exit from the first single facer. Moreover, the second grooving roller with helical grooving may likewise have a pitch angle which determines the offset angle $\beta$ by which the wave profile of the second single-flute corrugated cardboard web is offset upon exit from the second single facer. The achievable accuracy of the offset angles $\alpha$ and $\beta$ corresponds to the manufacturing precision with which the first and the second grooving roller are produced. The offset angles $\alpha$ and $\beta$ can thereby be set exactly in the corrugated cardboard architecture.

As a result, corrugated cardboard architectures which fully utilize the strengths of the paper employed can be implemented. Consequently, with a view to lightweight construction, material-saving, efficient and stable corrugated cardboard architectures can be implemented. This refers particularly to corrugated cardboard architectures, in which the offset angles $\alpha$ and $\beta$ have different amounts or orientations and thereby form grid-shaped structures in a central parting plane.

Furthermore, in the method according to the invention, the connection of the first and the second single-flute corrugated cardboard web may take place in such a way that the corrugated webs of the single-flute corrugated cardboard webs are glued to one another. This ensures direct contact of the corrugated webs and avoids the use of an additional paper ply between the corrugated webs. Corrugated cardboard architectures without an additional paper ply between the corrugated webs can, with otherwise identical parameters, have a more favorable ratio of stiffness to weight.

Furthermore, avoiding the need for paper ply in a corrugated cardboard product entails a considerable cost benefit and the saving of resources.

The invention relates, furthermore, to a corrugated cardboard product which comprises a first, a second, a third and an additional non-corrugated web. Moreover, the corrugated cardboard product according to the invention comprises a first, a second and a third corrugated web which lie in each case between two non-corrugated webs.

In this case, the corrugated cardboard product according to the invention has in the third corrugated web a wave profile which stands essentially at right angles to side margins of the corrugated cardboard product. A wave profile oriented in this way ensures high dimensional stability of the corrugated cardboard product under compressive load. Distortions are minimized. Moreover, the corrugated cardboard product according to the invention is provided with a first corrugated web which has a wave profile which is inclined at an offset angle $\alpha$ to side margins of the corrugated cardboard product. A wave profile, inclined at an offset angle $\alpha$, of a corrugated web gives the corrugated cardboard product increased bending resistance. Furthermore, in the same way, the corrugated cardboard product according to the invention may be equipped with a second corrugated web, the wave profile of which is inclined at an offset angle $\beta$ to side margins of the corrugated cardboard product. Wave profiles which are inclined at an offset angle $\alpha$ and/or $\beta$ increase the longitudinal bending resistance of the corrugated cardboard product.

In an advantageous embodiment of the corrugated cardboard product according to the invention, the third corrugated web has a greater flute height than the first and the second corrugated web. The flute height of a corrugated web determines the stiffness and consequently the bending behavior of a corrugated cardboard product. Furthermore, the flute height of a corrugated web determines the stackability of packaging which can be produced from the corrugated cardboard product.

The use of corrugated webs having a different flute height makes it possible to set exactly the stiffness and strength of the corrugated cardboard product to be produced. This adaptability enables the corrugated cardboard products according to the invention to be optimized in terms of a multiplicity of possible uses. The corrugated cardboard product according to the invention is efficient and viable with a view to light weight construction.

In a further advantageous embodiment of the corrugated cardboard product according to the invention, in at least one plane of a web longitudinal section, the head points of the first and the second corrugated web are in contact, in the region of head and foot points of the third corrugated web, with the third and the second non-corrugated web respectively. Mechanical loads which are introduced into the first and second corrugated web are transferred respectively to the head and the foot points of the third corrugated web. The introduction of a mechanical load into a head or foot point of a corrugated web enables the pressure stability of the latter to be utilized optimally. Pressure loads which act upon the corrugated cardboard product according to the invention are thus introduced into the pressure-stable third corrugated web, and deformations of the corrugated cardboard product at the side margins are reduced. The corrugated cardboard product according to the invention is efficient with a view to lightweight construction and ensures optimal utilization of the material properties of the paper webs employed.

BRIEF DESCRIPTION OF THE FIGURES

The invention is described in more detail below by means of the drawing in which:

FIG. 4 shows a perspective top view of a grooving roller having helical grooving, FIG. 5 shows a top view of the single-flute corrugated cardboard webs having an offset wave profile.

DESIGN VARIANTS

Figure 1:
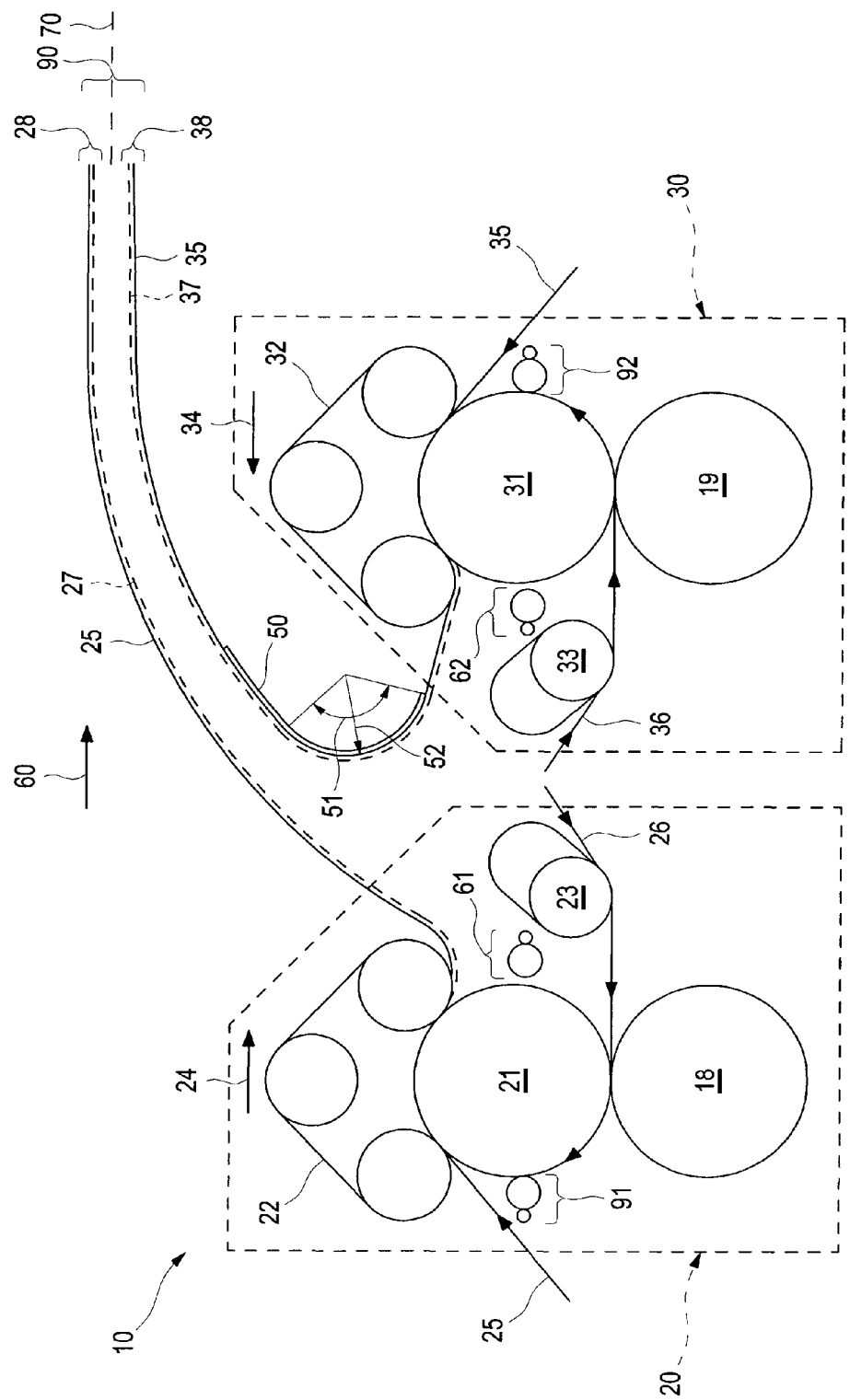
FIG. 1 shows a first configuration of a first single facer and of a second single facer, the single-flute corrugated cardboard webs generated in each case facing one another with their corrugated webs.

A first possibility for the arrangement of a first single facer and a second single facer, from which in each case single-flute corrugated cardboard webs are conveyed away, in each case with their corrugated webs lying opposite one another, may be gathered from FIG. 1.

A first single facer 20 comprises a first grooving roller 21 and its counterpiece 18 and also a first press-down belt 22 which is assigned to this first grooving roller 21 and which revolves via a plurality of deflecting rollers 96, 97 and part of which wraps around the circumference of the first grooving roller 21. On the entry site, the first grooving roller 21 of the first single facer 20 a first oblique guide roller 23 may be gathered. As indicated in FIG. 1 by the perspective reproduction of the first oblique guide roller 23, the latter is set obliquely with respect to the vertical in relation to the feed plane of a paper web 26.

The entering paper web 26 first passes over the circumference of the first oblique guide roller 23, is deflected by the latter and runs, in the deflected pretensioned state, into the nip between the first grooving roller 21 and its counterpiece 18. At the same time, a first non-corrugated web 25, which remains non-corrugated, runs onto the circumference of the first grooving roller 21 and covers the top side of the paper web 26 running off from the circumference of the first grooving roller 21 and then having a corrugated profile. The two webs, that is to say the first non-corrugated web 25 and the then corrugated web 27, pass through the press-down nip between the revolving first press-down belt 22 and the circumference of the first grooving roller 21. A first single-flute corrugated cardboard web 28, which comprises the first non-corrugated web 25 and the corrugated web 27, runs in a first web conveying direction 24 out of the first single facer 20 in a vertically S-shaped arc.

As may be gathered, moreover, from the illustration according to FIG. 1, the apparatus proposed according to the invention comprises, furthermore, a second single facer 30. Similarly to the first single facer 20, the second single facer 30 comprises a second grooving roller 31. The second grooving roller 31 cooperates with its counterpiece 19. A paper web 36 runs into a nip, which is formed by the circumference of the second grooving roller 31, and is pretensioned and deflected by a second oblique guide roller 33 which is set obliquely with respect to the vertical conveying plane. The second paper web 36, which passes over the second oblique guide roller 33, is provided with a wave profile in the nip between the second grooving roller 31 and its counterpiece 19. Then, the second paper web 36, as a corrugated web 37, together with a second non-corrugated web 35, which is likewise conveyed the in the direction onto the circumference of the second grooving roller 31, leaves the second single facer as a second single-flute corrugated cardboard web 38 after passing over the second press-down belt 32. The second single-flute corrugated cardboard web 38, after leaving the second single facer 30, is guided via a deflection 50. The deflection 50 is, in particular, a stationarily formed deflection 50 in the shape of a deflecting plate or guide plate. What is achieved by the deflection 50 is that the freshly generated second single-flute corrugated cardboard web 38, comprising the second non-corrugated web 35 and the corrugated web 37, is deflected under minimal mechanical stress into a running direction 60. For this purpose, the deflection has a radius, selected relatively large, which lies preferably in a range of between 0.5 m and 1.5 m, in order to ensure as uniform a conveying path as possible which brings about only minor mechanical stresses in the second single-flute corrugated cardboard web 38.

After leaving the second single facer 30, the first single-flute corrugated cardboard web 28, with its corrugated web 27 pointing downward, and the freshly generated second single-flute corrugated cardboard web 38, with its corrugated web 37 pointing upward, lie opposite one another. The then generated single-flute corrugated cardboard webs 28 and 38 can then be brought together in a central parting plane 70, so as to give rise to a corrugated cardboard product which manages without an intermediate ply. At the wave profiles, offset to one another, of the corrugated webs 27 and 37 pointing toward one another, connected in a materially integral manner, preferably glued together. This gives rise to a corrugated cardboard product 90 which is distinguished by high mechanical stability. The corrugated cardboard product 90 acquires high mechanical stability due to the fact that an offset grid pattern is obtained between the single-flute corrugated cardboard webs 28, 38 because of the helical grooving 41 on the circumference of the two grooving rollers 21, 31.

Figure 2:
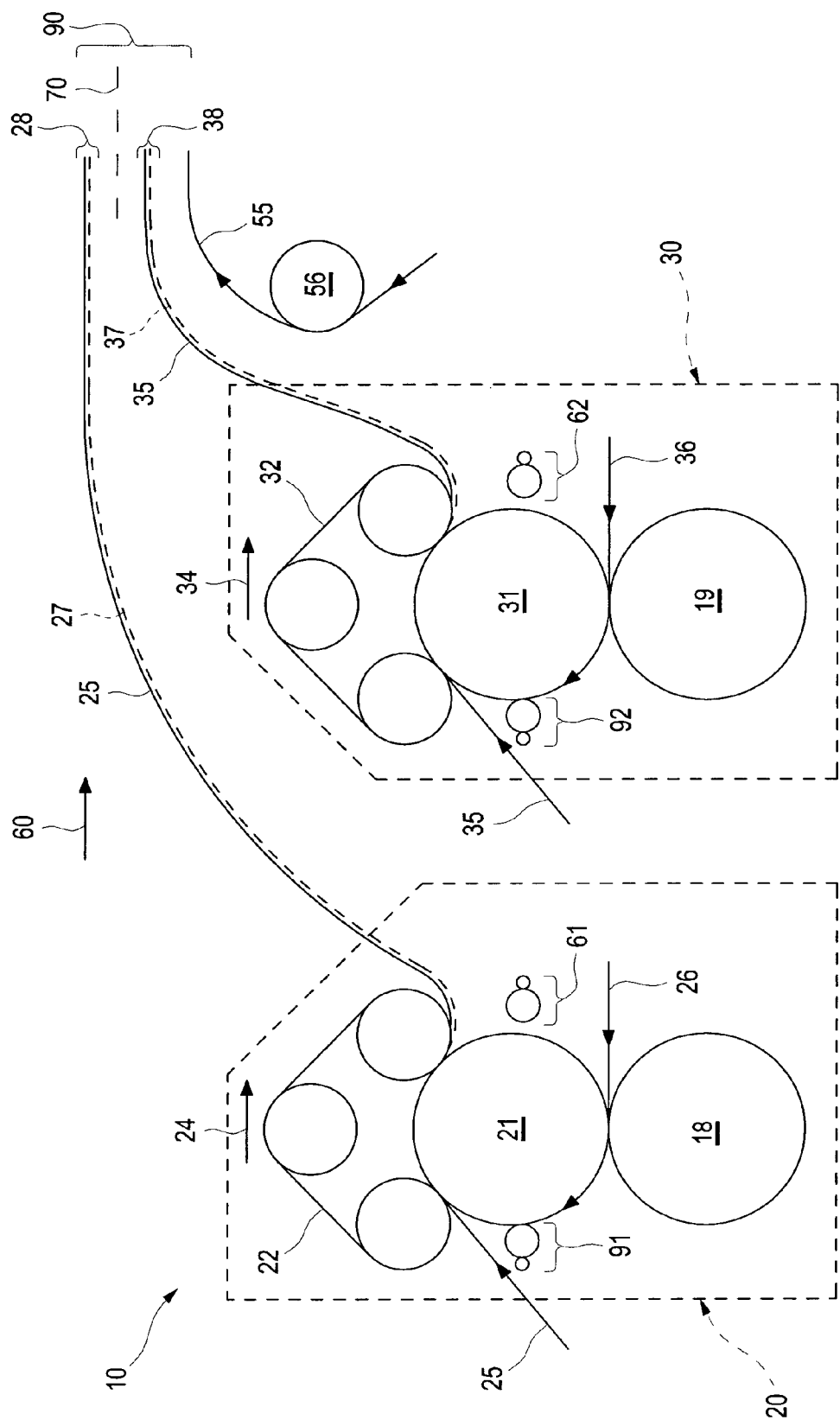
FIG. 2 shows a second configuration of the first single facer and of the second single facer, the two single-flute corrugated cardboard webs produced running codirectionally and an additional non-corrugated web being fed separately.

A further configuration of the apparatus proposed according to the invention, which comprises a first single facer 20 and a second single facer 30, may be gathered from the illustration according to FIG. 2.

It is apparent from the illustration according to FIG. 2 that the first single facer 20 according to the illustration in FIG. 2 is constructed in a similar way to the first single facer 20 according to the design variant in FIG. 1. FIG. 2 shows that the first grooving roller 21 arranged in the first single facer 20 is assigned the first press-down belt 22. Furthermore, the first grooving roller 21 is assigned a counterpiece 18, so that these form a nip, in front of which a first oblique guide roller 23 is arranged. By means of the oblique guide roller, the first paper web 26 is tensioned and deflected. Furthermore, the first non-corrugated web 25 runs into the press-down nip between the first press-down belt 22 and the circumference of the first grooving roller 21. As a result of helical grooving 41 on the circumference of the first grooving roller 21, the entering paper web 26 gives rise to the corrugated web 27 which has an offset wave profile. The first single-flute corrugated cardboard web 28, which comprises the first non-corrugated web 25 and the then corrugated web 27, runs out of the first single facer 20. It can be gathered from the illustration according to FIG. 2 that the first single-flute corrugated cardboard web 28 runs toward a central parting plane 70 in the running direction 60.

In the configuration, illustrated in FIG. 2, of the second single facer 30, the second non-corrugated web 35 runs in the same direction as the first non-corrugated web 25 onto the circumference of the second grooving roller 31. Moreover, the second paper web 36 runs in the same direction as the first paper web 26 into the nip between the second grooving roller 31 and its counterpiece 19. The second oblique guide roller 33 is assigned to the paper web 36 in front of this nip on the web entry side. As a result of this, second single-flute corrugated cardboard web 38 leaves the second single facer 30 in the second web conveying direction 34 which is identical to the running direction 60 and to the first web conveying direction 24.

Furthermore, it may be gathered from the illustration according to FIG. 2 that, in this configuration, a feed roller 56 is provided, via which an additionally non-corrugated web 55 runs off and the corrugated web 37 is brought up, so as to form a corrugated cardboard product 90 which comprises the first non-corrugated web 25, the corrugated web 27, the second non-corrugated web 35, the corrugated web 37 and the additional non-corrugated web 55 brought up via the feed roller 56. A five-ply corrugated cardboard product 90 with two corrugated webs 27, 37 is obtained.

In the machine configurations according to FIGS. 1 and 2 for the first and the second paper webs 26, 36, in each case the first and the second oblique guide roller 23, 33 are arranged. These tauten the still non-corrugated paper webs 26 and 36, so that these run, pretensioned, onto the circumferential surfaces of the first and second grooving roller 31 which have in each case helical grooving 41. This gives rise in each case to the wave profile, illustrated in FIG. 5, in the first and the second single-flute corrugated cardboard web 28, 38 with the offset angles α, β.

Whereas, in the machine configuration according to FIG. 1, a deflection 50 is required downstream of the second single facer 30, in the configuration according to FIG. 2 there is no need for this on account of the corresponding conveying directions of the non-corrugated webs 25, 35 and of the paper webs 26, 36. In the configuration illustrated in FIG. 1, single-flute corrugated cardboard webs 28, 38 are provided in the central parting plane 70 for a four-ply corrugated cardboard product 90 without an intermediate ply. FIG. 2 illustrates the generation of a five-ply corrugated cardboard product 90 having the additional non-corrugated web 55.

Figure 3:
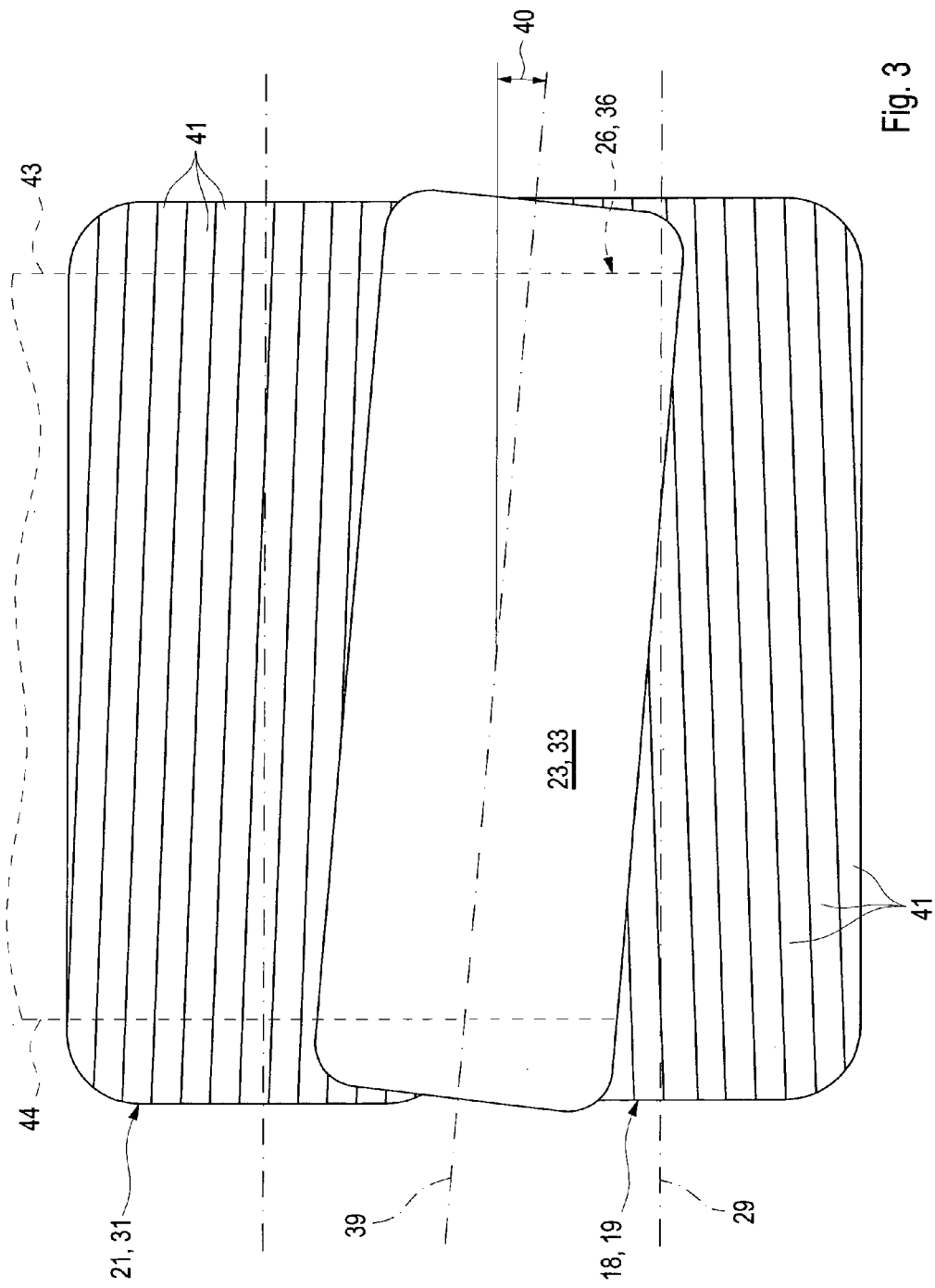
FIG. 3 shows a grooving roller with a counterpiece which is assigned an oblique guide roller.

FIG. 3 shows a top view of an oblique guide roller 23 or 33 which lies upstream of a grooving roller 21 or 31.

It may be gathered from FIG. 3 that the oblique guide rollers 23 and 33, which are arranged upstream of the grooving rollers 21 and 31, are deflected at an inclination angle 40 with respect to the axis of rotation 29 or 39 of the grooving roller 21 or 31. The paper webs 26 and 36, when they pass over the oblique guide rollers 23 and 33, undergo deformation or pretensioning and run tautened onto the circumferential surfaces of the grooving rollers 21 and 31. The helical grooving 41 runs at a pitch angle 42 which is also illustrated in the perspective view according to FIG. 4.

The grooving rollers 21, 31 are in each case mounted on a counterpiece 18, 19, with which they form in each case a nip. The nip is concealed in FIG. 3 by the guide roller 23, 33.

The pitch angle 42 determines the orientation of the wave profile which is embossed onto the first and the second paper web 26, 36 by the first and the second grooving roller 21, 31 respectively. After running through the press-down nip of the press-down belt 22, 32, the paper web 26, 36 forms the corrugated web 27, 37 of the first and second single-flute corrugated cardboard web 28, 38, as illustrated in FIG. 5. The orientation and size of the inclination angle 40 of the guide rollers 26, 36 and the orientation and the size of the pitch angle 42 of the helical grooving rollers 21, 31 may be changed, depending on the configuration required.

A perspective top view of one of the grooving rollers 21 and 31 may be gathered from the illustration according to FIG. 4.

FIG. 4 shows that a helically running grooving 41 is formed on the circumference of the grooving roller 21 or 31. As indicated in FIG. 4, there is a pitch angle 42 with respect to a line, depicted by dashes, parallel to the axis of rotation 29 or 39 of the grooving roller 21 or 31. The pitch angle 42 preferably lies between 0° and 13°, especially preferably between 3° and 10°.

The arrow, which is designated by the reference symbol 24 and 34, designates the web conveying directions in which the first and the second single-flute corrugated cardboard web 28, 38 emerge from the first and the second single facer 20, 30.

FIG. 5 shows a top view of the single-flute corrugated cardboard web 28, 38. It may be gathered from the illustration according to FIG. 5 that the single-flute corrugated cardboard webs 28 and 38 running in the running direction 60 comprise in each case corrugated webs 27 and 37 and in each case non-corrugated webs 25 and 35. In FIG. 5, the corrugated web 27, 37 conceals the non-corrugated webs 25, 35. The wave profile of the corrugated webs 27, 37 is offset by the offset angles α and β with respect to the side margins 43, 44. The offset angles α, β are determined by the pitch angle 42 of the grooving rollers 21 and 31 of the first and the second single facer and their counterpieces 18, 19. Lateral margins of the paper webs 26, 36, which, after emerging from the first and the second single facer 20, 30, form the corrugated web 27, 37 of the first and of the second single-flute corrugated cardboard web 28, 38, define the side margins 43, 44 as the first and the second single-flute corrugated cardboard web 28, 38 and of the corrugated cardboard product 90.

Figure 6:
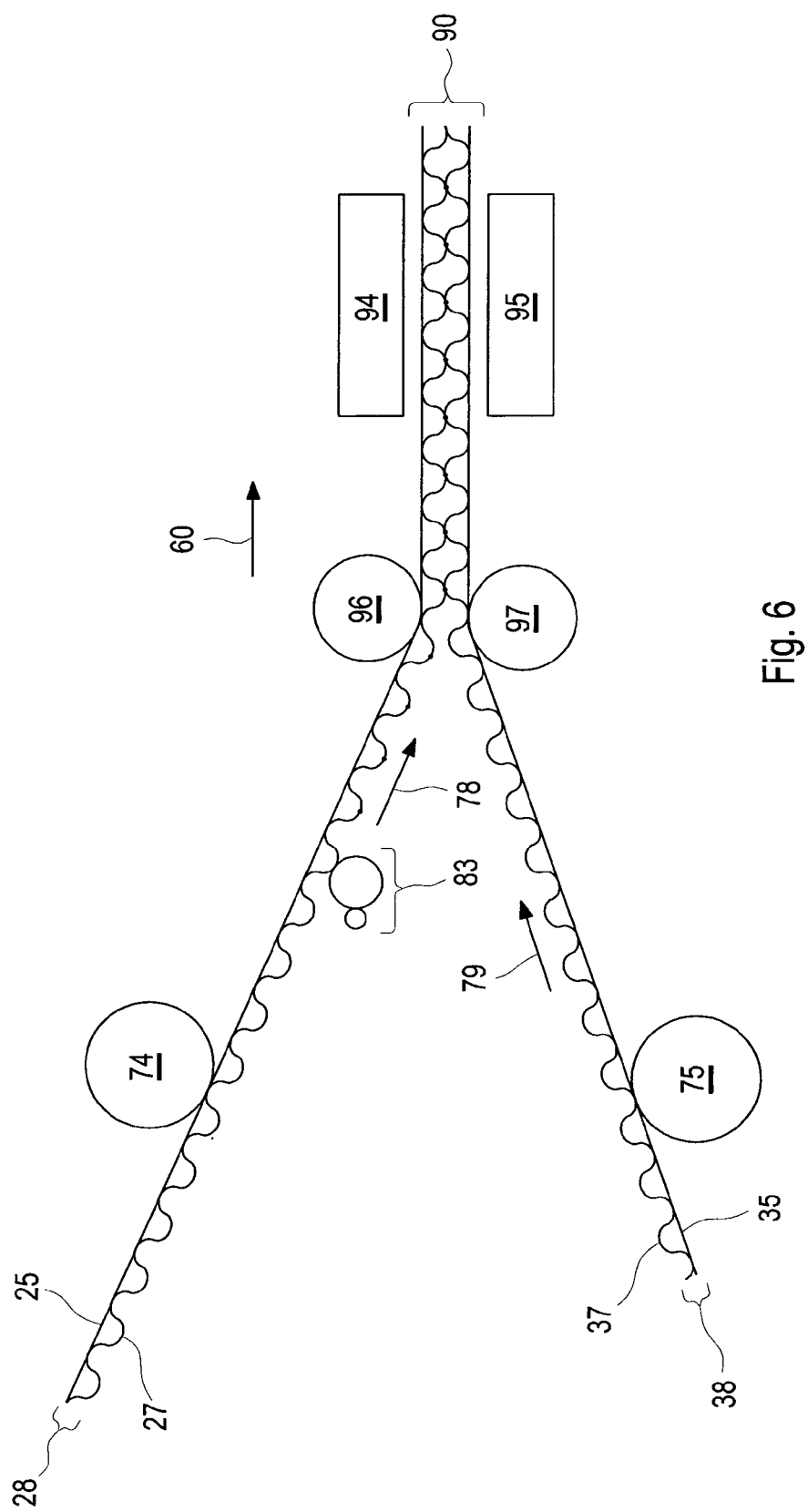
FIG. 6 shows a side view of the bringing together of two single-flute corrugated cardboard webs to form a corrugated cardboard product.

FIG. 6 illustrates the bringing together of a first single-flute corrugated cardboard web 28 with a second single-flute corrugated cardboard web 38. The first single-flute corrugated cardboard web, which comprises a first non-corrugated web 25 and a first corrugated web 27, is in this case guided along at a first regulating roller 74. Furthermore, the single-flute corrugated cardboard web 28 is deflected at a first deflecting roller 96. In the bringing together according to FIG. 6, the second single-flute corrugated cardboard web 38, which comprises a second corrugated web 37 and a second non-corrugated web 35, is guided along at a second regulating roller 75 and is deflected at a second deflecting roller 97. The conveyance of the first single-flute corrugated cardboard web takes place in a first conveying direction 78 and the conveyance of the second single-flute corrugated cardboard web 38 takes place in a second conveying direction 79. The single-flute corrugated cardboard webs 28, 38 are brought together in the region of the deflecting rollers 96, 97 to form a corrugated cardboard product 90. The corrugated cardboard product 90 is transported further along a running direction 60. Moreover, a glue applicator unit 83 is mounted in the bringing-together region and provides head points of the corrugated web 27 with an adhesive. The adhesive applied by glue applicator unit 83 ensures that the first and the second single-flute corrugated cardboard web 28, 38 are connected to form the corrugated cardboard product 90. Furthermore, the first and second single-flute corrugated cardboard web 28, 38 are joined together in such a way that the head points of the first and the second corrugated web 27, 37 touch one another in the corrugated cardboard product 90. For the further processing of the corrugated cardboard product, further processing devices 94, 95 are formed downstream of the deflecting rollers 96, 97, as seen in the running direction 60. A processing device 94, 95 may be designed as a press-down plate, heating plate, press-down belt or the like. The processing devices serve for stabilizing the corrugated cardboard product 90.

Figure 7:
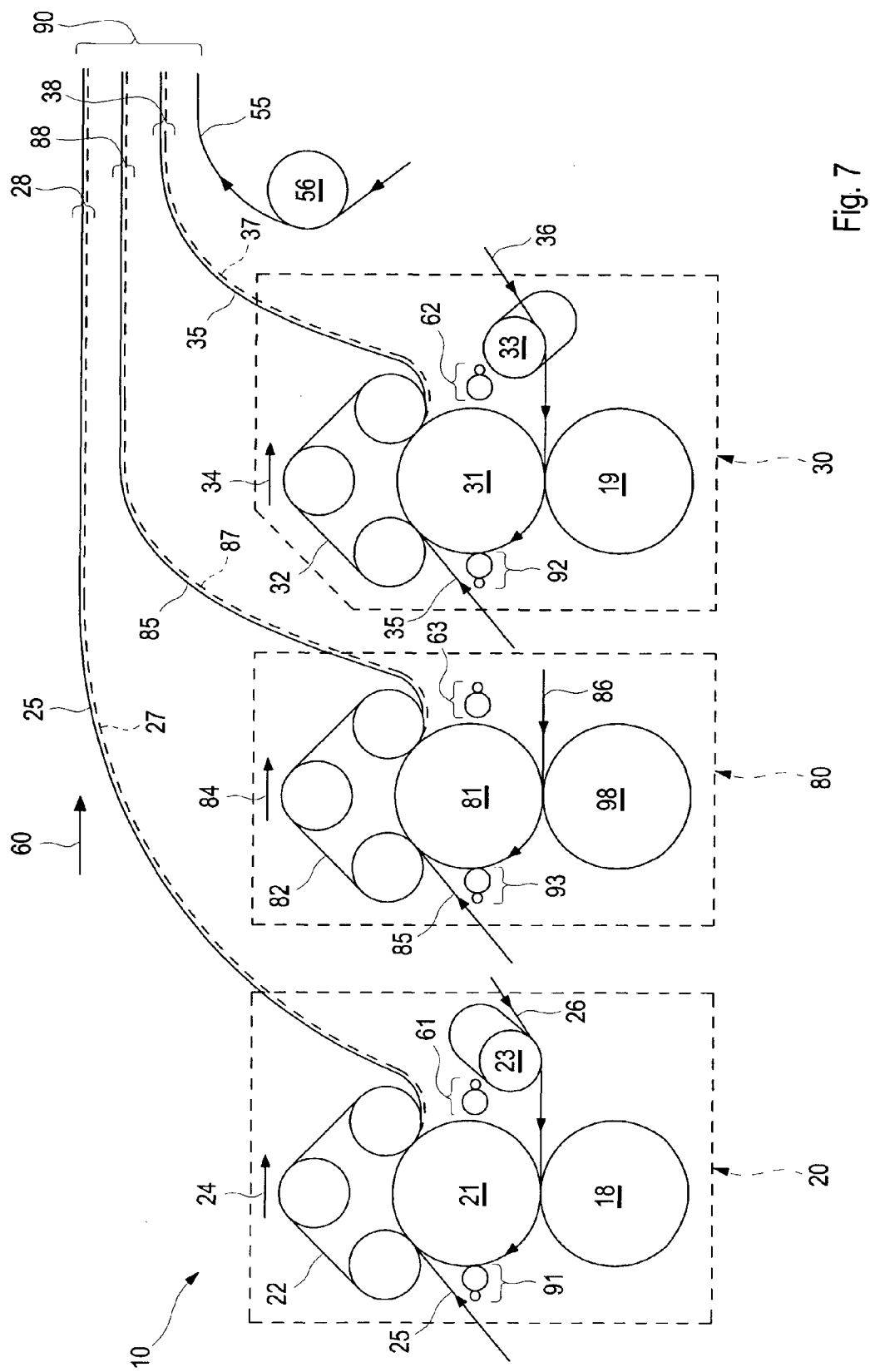
FIG. 7 shows a third arrangement of a first facer with a second and third single facer, in which three single-flute corrugated cardboard webs are connected to form a corrugated cardboard product.

FIG. 7 shows diagrammatically a preferred embodiment of the apparatus 10 according to the invention. This comprises a first single facer 20 which has a first grooving roller 21 with a counterpiece 18. The first grooving roller 21 and its counterpiece 18 form a nip, into which a first paper web 26 is introduced. The first grooving roller 21 has grooving (not illustrated), by means of which a wave profile is embossed onto the first paper web 26. Moreover, the first single facer has a first oblique guide roller 23, around which the first paper web 26 is guided. The first oblique guide roller 23 is mounted at a vertical inclination angle and ensures taut guidance of the first paper web 26. Furthermore, the first single facer 20 has a pair of glue applicator rollers 91 providing one side of the first paper web 26 with adhesive. The first single facer 20 is equipped with an additional glue applicator unit 61 which, in FIG. 7, is not in engagement. The additional glue applicator unit 61 makes it possible to convert the first single facer 20. Moreover, the first single facer 20 has a first press-down belt 22 which bears against the first grooving roller 21. The first paper web 26 provided with a wave profile and a first non-corrugated web 25 are introduced into the nip between the first press-down belt 22 and the first grooving roller 21. The first press-down belt 22 connects the first paper web 26 to the non-corrugated web 25 and from these forms a first single-flute corrugated cardboard web 28. The first single-flute corrugated cardboard web comprises the first non-corrugated web 25 and a corrugated web 27 which arises from the first paper web 26. The first single facer 20 has a first web conveying direction 24 which is codirectional to the running direction 60 of the apparatus 10 according to the invention.

Moreover, the arrangement, illustrated in FIG. 7, of the apparatus according to the invention has a second single facer 30 which comprises a second grooving roller 31 with a counterpiece 19. The second grooving roller 31 forms with its counterpiece 19 a nip, into which a second paper web 36 is introduced. The second grooving roller embosses a wave profile onto the second paper web 36. Furthermore, the second grooving roller 31 has helical grooving 41 (not illustrated). Moreover, the second paper web 36, before entry into the nip between the second grooving roller 31 and its counterpiece 19, is guided via a second oblique guide roller 33. The second oblique guide roller 33 is inclined at a vertical inclination angle 40. The vertical inclination angle 40 of the first and of the second oblique guide roller 23, 33 are in this case oriented contradirectionally. With respect to the conveying direction of the first paper web 26, the left side margin of the latter is tautened, and, with respect to the conveying direction of the second paper web 36, the right side margin of the latter is tautened. Moreover, the second single facer 30 is equipped with a second glue applicator roller 92 which provides the second paper web 36 with adhesive. Furthermore, the second single facer 30 is equipped with an additional glue applicator unit 62 which, in FIG. 7 is not in engagement. The additional glue applicator unit 62 makes it possible to convert the second single facer 30. The second single facer 30 has a second press-down belt 32 which bears against the second grooving roller 31. The second paper web 36 provided with a wave profile and the second non-corrugated web 35 are introduced into the nip formed by the second press-down belt 32 and by the second grooving roller 31. In the nip between the second press-down belt 32 and the second grooving roller, the second non-corrugated web 35 and the second paper web 36 are connected to form a second single-flute corrugated cardboard web 38. The second single-flute corrugated cardboard web 38 comprises the second non-corrugated web 35 and a second corrugated web 37 which arises from the second paper web 36. The second single facer 30 has a second web conveying direction 34 in which the second single-flute corrugated cardboard web 38 is conveyed. In this case, the second web conveying direction 34 is codirectional to the running direction 60 of the apparatus according to the invention.

Moreover, the apparatus according to the invention has according to FIG. 7 a third single facer 80 which comprises a third grooving roller 81 and its counterpiece 98. The third grooving roller 81 and its counterpiece 98 form a nip, into which a third paper web 86 is introduced. The third grooving roller 81 provides the third paper web 86 with a wave profile, the third grooving roller 81 having parallel grooving (not illustrated). Furthermore, the third single facer 80 has a third glue applicator unit 93 which provides the third paper web 86 subjected to a wave profile with adhesive. Furthermore, the third single facer 80 is equipped with an additional glue applicator unit 63 which, in FIG. 7, is not in engagement. The additional groove applicator unit 63 makes it possible to convert the third single facer 80. Furthermore, the third single facer has a third press-down belt 82 which is in contact with the third grooving roller 81. The third press-down belt 82 forms with the third grooving roller 81 a nip, into which the third paper web 86 and a third non-corrugated web 85 are introduced. The third press-down belt 82, in interaction with the third grooving roller 81, connects the third non-corrugated web 85 to the third paper web to form a third single-flute corrugated cardboard web 88. The third single-flute corrugated cardboard web 88 comprises the third non-corrugated web 85 and a third corrugated web 87 which arises from the third paper web 86. The third single facer 80 has a third web conveying direction 84 in which the third single-flute corrugated cardboard web 88 is conveyed. The third web conveying direction 84 is codirectional to the running direction 60 of the apparatus according to the invention. Moreover, the apparatus according to the invention has according to FIG. 7 a feed roller 56, via which an additional non-corrugated web 55 is fed. The first single-flute corrugated cardboard web is oriented in such a way that the first corrugated web 27 is opposite the third non-corrugated web 85. Moreover, the third single-flute corrugated cardboard web 88 is arranged in such a way that the third corrugated web 87 faces the second non-corrugated web 35. The second single-flute corrugated cardboard web 38 is arranged in such a way that its second corrugated web 37 faces the additional non-corrugated web 25. The first, the second and the third single-flute corrugated cardboard web 28, 38, 88 and the additional non-corrugated web are connected in the arrangement described to form a corrugated cardboard product 90.

Figure 8:
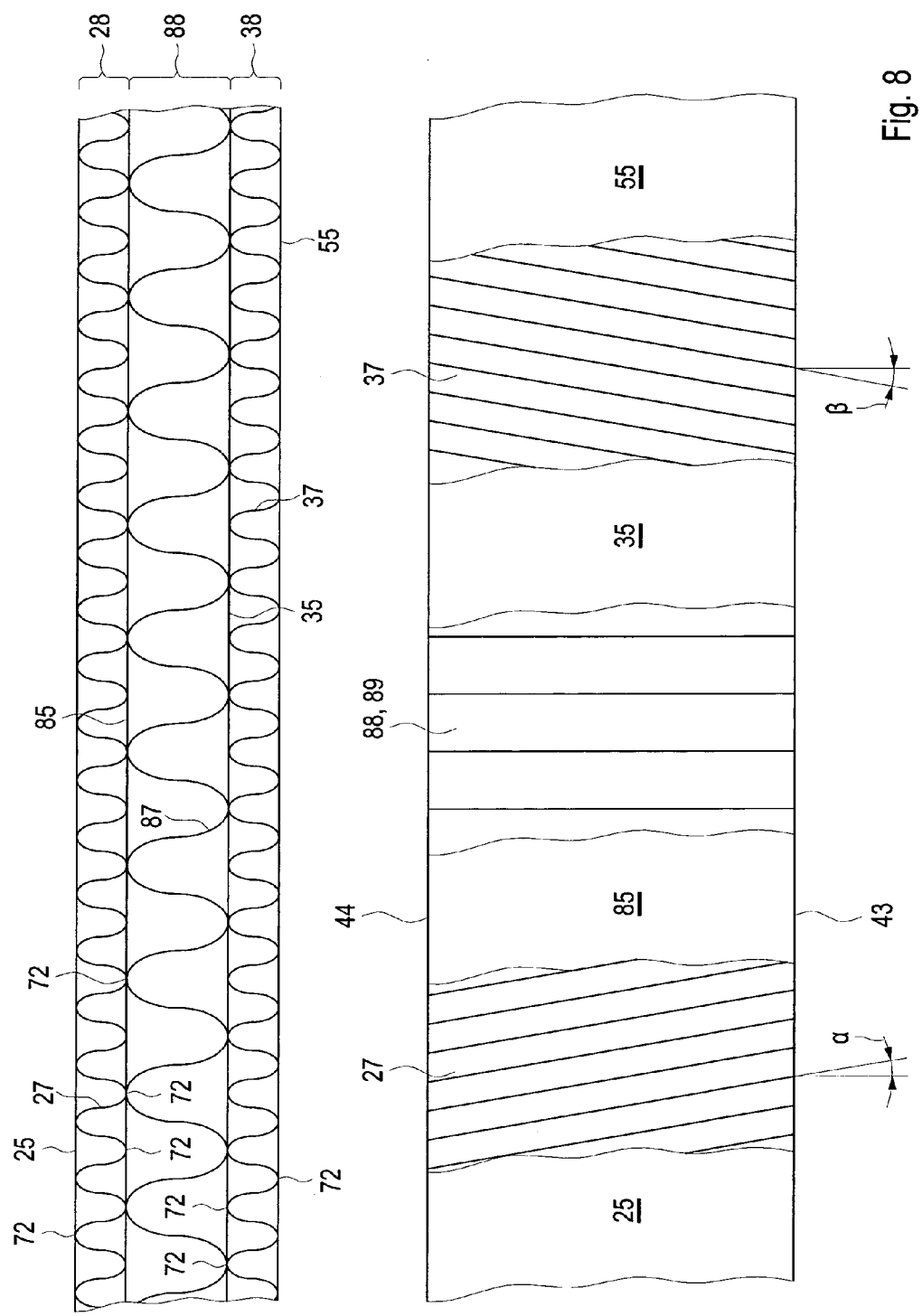
FIG. 8 shows a set-up of a corrugated cardboard product which comprises three corrugated webs, the wave profiles of which are offset differently.

FIG. 8 illustrates the set-up of a corrugated cardboard product according to the invention. This comprises a first, second, third and additional top ply 25, 85, 35 and an additional top ply 55. A first, second and third corrugated web 27, 37, 87 are arranged between the top plies 25, 35, 85, 55. The third corrugated web 87 has in this case a greater flute height than the second and the third corrugated web 27, 37. Moreover, head points 72 of the first and the second corrugated web 27, 37 are connected respectively to the second and third non-corrugated web 35, 85 in the region of head points 72. Contact between head and foot points 72 of the corrugated webs 27, 37, 87 ensures, under compressive load upon the corrugated cardboard product 90, a mechanically favorable introduction of force into the third corrugated web 87. Moreover, the third corrugated web 87 has a wave profile which stands essentially at right angles to side margins 43, 44 of the corrugated cardboard product 90. Furthermore, the wave profile of the first corrugated web 27 is offset at an offset angle $\alpha$ and the wave profile of the second corrugated web 37 is offset at an offset angle $\beta$. The offset angles $\alpha$, $\beta$ are in this case oriented contradirectionally. The wave profile 86 of the third corrugated web 87 forms with the wave profiles of the first and the second corrugated web 27, 37 a symmetrical grid structure. The symmetrical grid structure of the wave profiles ensures a high degree of stiffness of the corrugated cardboard product according to the invention.

LIST OF REFERENCE SYMBOLS

10 Apparatus
18 Counterpiece
19 Counterpiece
20 First single facer
21 First grooving roller
22 First press-down belt
23 First oblique guide roller
24 First web conveying direction
25 First non-corrugated web
26 First paper web
27 Corrugated web
28 First single-flute corrugated cardboard web
29 Axis of rotation grooving roller
30 Second single facer
31 Second grooving roller
32 Second press-down belt
33 Second oblique guide roller
34 Second web conveying direction
35 Second non-corrugated web
36 Second paper web
37 Corrugated web
38 Second single-flute corrugated cardboard web
39 Axis of rotation oblique guide roller
40 Inclination angle
41 Helical grooving
42 Pitch angle
43 Side margin
44 Side margin
50 Deflection
51 Looping angle
52 Deflecting radius
55 Additional non-corrugated web
56 Feed roller
60 Running direction
61 Additional glue applicator unit
62 Additional glue applicator unit
63 Additional glue applicator unit
70 Parting plane
74 First regulating roller
75 Second regulating roller 78 Conveying direction
79 Conveying direction
80 Third single facer
81 Third grooving roller
82 Third press-down belt
83 Glue applicator unit
84 Third web conveying direction
85 Additional non-corrugated web
86 Third paper web
87 Third corrugated web
88 Third single-flute corrugated cardboard web
89 Parallel wave profile
90 Corrugated cardboard product
91 Glue applicator unit
92 Glue applicator unit
93 Glue applicator unit
94 Processing device
95 Processing device
96 First deflecting roller
97 Second deflecting roller
98 Counterpiece
α Offset angle
β Offset angle

The invention claimed is:

1. An apparatus for the production of a corrugated cardboard product, comprising at least one first single facer and one second single facer which are provided in each case with a press-down belt and with a grooving roller, the grooving rollers being designed for embossing a wave profile in each case onto a paper web, and the press-down belt being designed in each case with the grooving rollers for connecting the paper webs in each case to a non-corrugated web to form in each case a single-flute corrugated cardboard web, characterized in that at least the first single facer is equipped with a first oblique guide roller, the axis of rotation of which is inclined at a vertical inclination angle between side margins of a first paper web that corresponds to the first single facer, wherein the first oblique guide roller defines a direct path into the respective grooving roller for the first paper web.

2. The apparatus as claimed in claim 1, characterized in that the second single facer is equipped with a second oblique guide roller, the axis of rotation of which is inclined at a vertical inclination angle between side margins of a second paper web.

3. The apparatus as claimed in claim 2, characterized in that the first and the second oblique guide roller are inclined at contradirectionally oriented vertical inclination angles.

4. The apparatus as claimed in claim 1, characterized in that the first single facer has a first web conveying direction which is opposite to a second web conveying direction of the second single facer.

5. The apparatus as claimed in claim 1, characterized in that the second single facer has a deflection for deflecting the second single-flute corrugated cardboard web, the deflection being designed as a stationary guide plate or stationary deflecting plate.

6. The apparatus as claimed in claim 5, characterized in that the deflection has a looping angle of 90° to 180°.

7. The apparatus as claimed in claim 5, characterized in that the deflection has a deflecting radius in the range of between 0.5 m and 1.5 m.

8. The apparatus as claimed in claim 1, characterized in that the first grooving roller is provided with helical grooving which has a pitch angle with respect to an axis of rotation of the first grooving roller.

9. The apparatus as claimed in claim 8, characterized in that the pitch angle of the helical grooving of the first grooving roller has the same orientation as the inclination angle of the first vertically inclined guide roller.

10. The apparatus as claimed in claim 1, characterized in that the second grooving roller is provided with helical grooving which has a pitch angle with respect to an axis of rotation of the second grooving roller.

11. The apparatus as claimed in claim 10, characterized in that the pitch angle of the helical grooving of the second grooving roller has the same orientation as the inclination angle of the second vertically inclined guide roller.

12. The apparatus as claimed in claim 8, characterized in that the helical grooving of the first grooving roller has a pitch angle which corresponds to an offset angle α by which the wave profile of the first single-flute corrugated cardboard web is offset.

13. The apparatus as claimed in claim 1, characterized in that the operating direction of the second single facer is reversible.

14. The apparatus as claimed in claim 1, characterized in that this is equipped, for the production of a third single-flute corrugated cardboard web, with a third single facer which has a third grooving roller which is designed for embossing a wave profile onto a third paper web.

* * * * *